June 3, 1969 R. M. HENDERSON ET AL 3,448,294
MULTIPHASE POWER SWITCHING CIRCUIT
Filed Sept. 15, 1965 Sheet 1 of 3
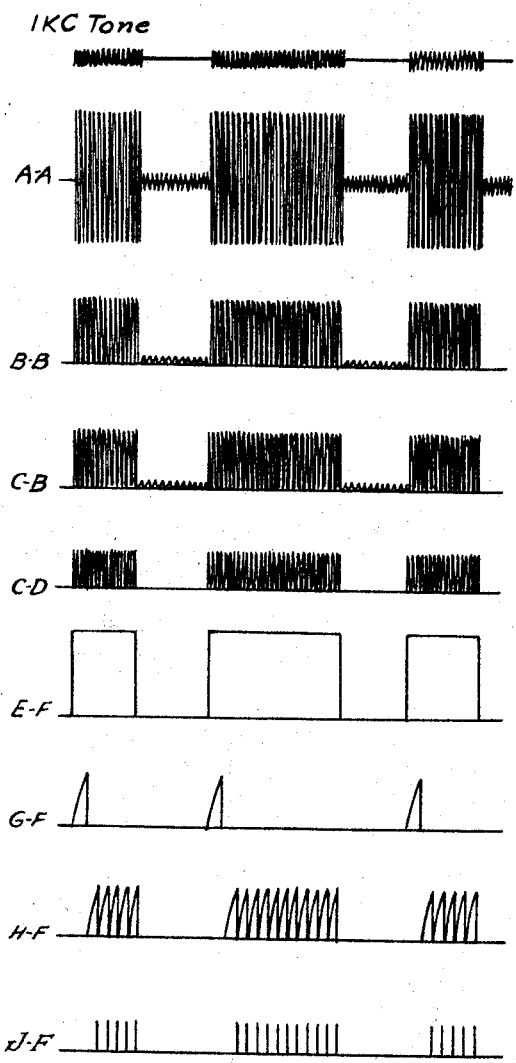
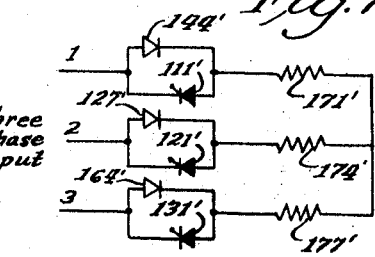
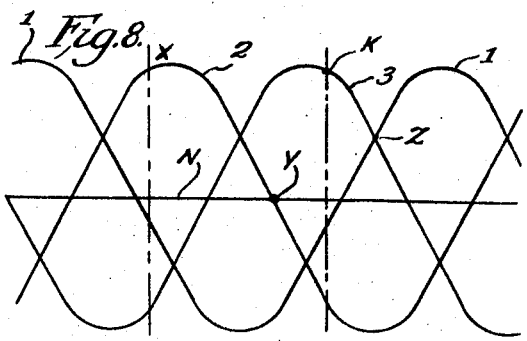
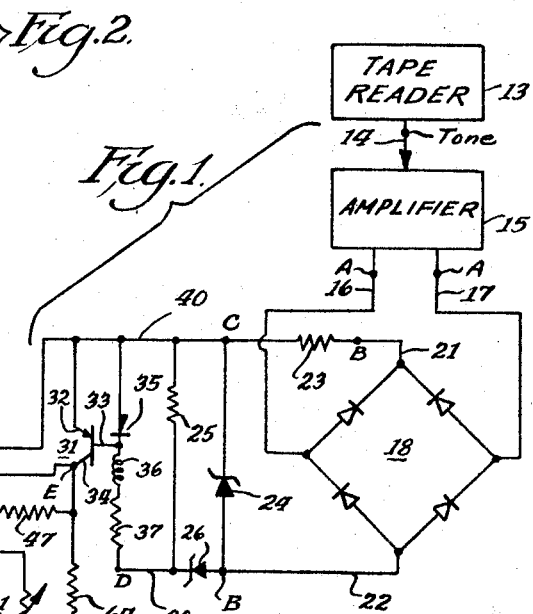
Inventors
Robert M. Henderson
& Richard Zechlin
By
Petherbridge, O'Neill & Aubel Attys

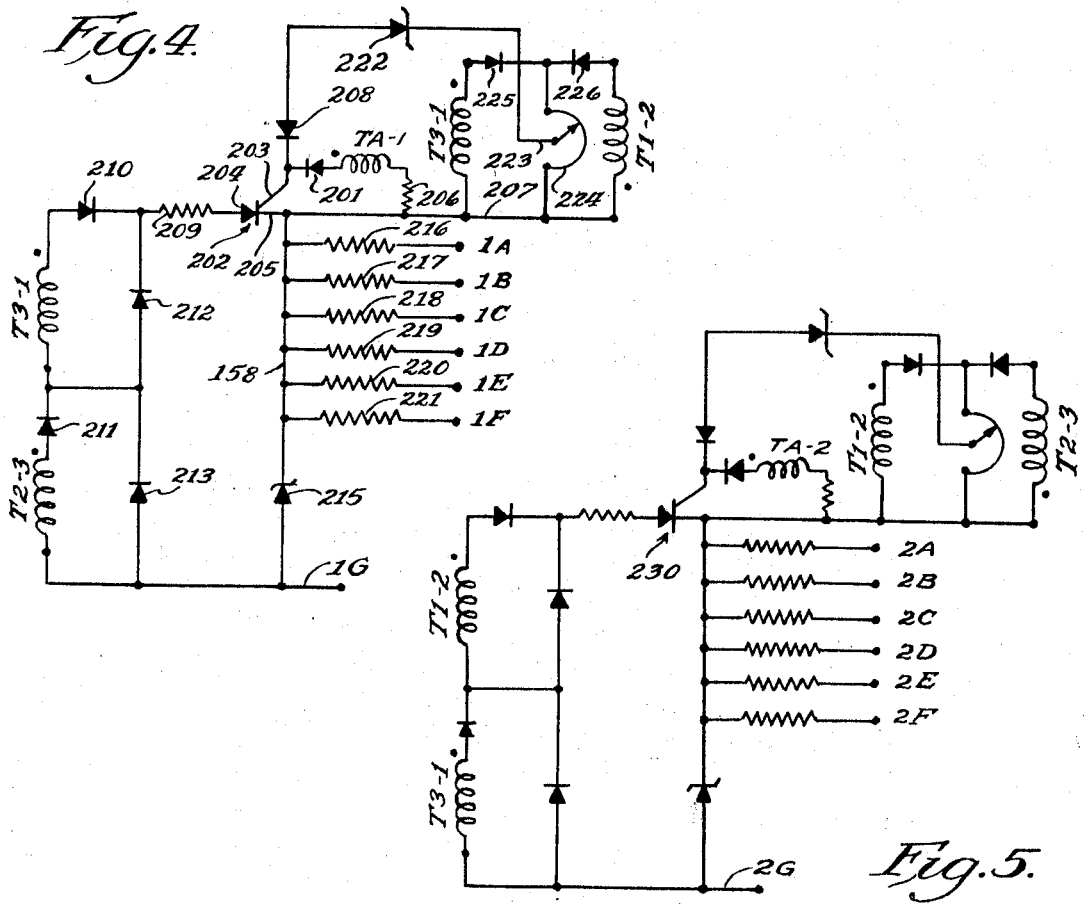
Fig. 4.
Fig. 5.
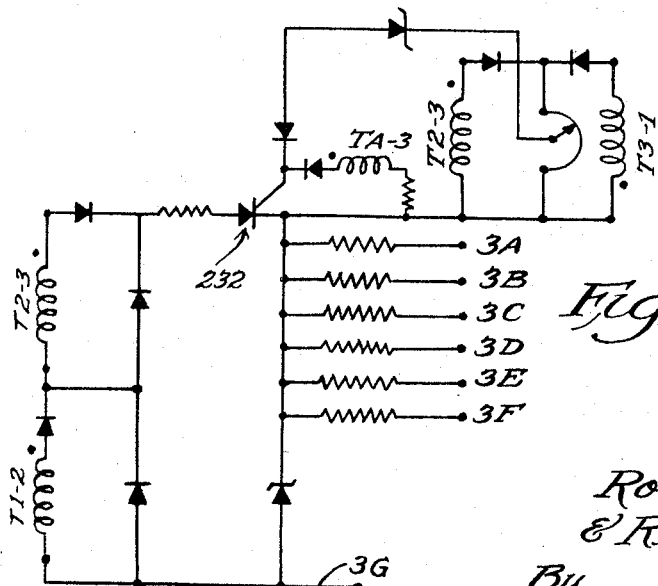
Fig. 6.
Inventors:
Robert M. Henderson
& Richard Zechlin.
By
Petherbridge, O'Neill & Aubel
Attys.

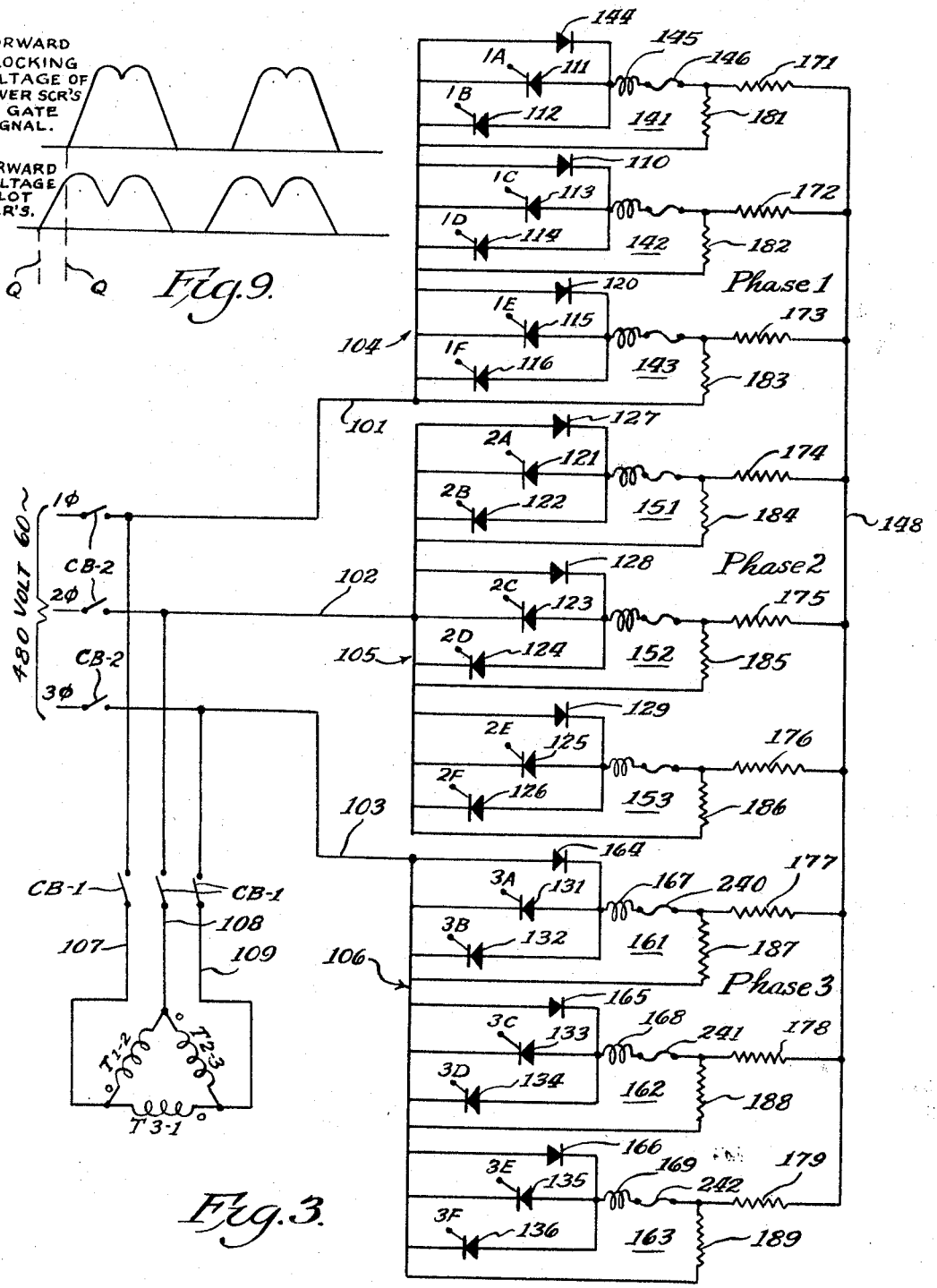

United States Patent Office 3,448,294
Patented June 3, 1969

3,448,294
MULTIPHASE POWER SWITCHING CIRCUIT
Robert M. Henderson, Williams Bay, and Richard Zechlin, Beloit, Wis., assignors to Fairbanks Morse Inc., New York, N.Y., a corporation of Delaware
Filed Sept. 15, 1965, Ser. No. 487,439
Int. Cl. H03k 17/02
U.S. Cl. 307—252    7 Claims

ABSTRACT OF THE DISCLOSURE

A load switching system is disclosed including a control circuit responsive to input signals for controlling the operation of a multiphase power switching circuit.

---

This invention relates to a means for switching heavy loads of power at very rapid rates, and has been found to be useful in testing the operating characteristics of a low frequency, high power transmitter.

In one particular instance, it was desired to test the operation of the generator sets which supply transmitter power in a very low frequency communication system prior to installation of the entire transmitter system in a remote, relatively inaccessible location. The invention made possible the testing of the transmitter before shipping the transmitter to its installation site to assure that the entire transmitting system was operating properly to installation.

The circuitry of the invention includes solid state devices which enable power switching to be accomplished at rates faster than can be obtained by the use of contact closing means. If contact closing means could switch at the required rates, the wear and deterioration characteristic of such devices result in frequent expenditures of time and money to effect maintenance and repair, or replacement. It has been found that a switching means composed of solid state devices will be much more reliable and safe in operation over prolonged periods of time than a similar device employing contact closing means.

Further, there is no arcing associated with the solid state devices used in the invention as may be the case with contact closing means, especially when heavy electrical loads are being switched.

One such embodiment of solid state switching system is capable of switching 1650 kw. of power at a rate of 20 milliseconds on and 20 milliseconds off. The power load capacity of the switching system depends upon the power rating of the individual solid state devices used and the number of such devices employed. The maximum rate of switching is limited by a specific characteristic of the solid state devices utilized for the purpose. In the instance mentioned, an electrical load equivalent to that of an operating transmitter keyed to broadcast signals was simulated. This particular use of the invention made it possible to test the power generating system for such things as voltage and frequency regulations, cross current compensation, paralleling of motor generator sets, governor control and stability, and generator and exciter stability.

It is accordingly a principal object of the present invention to provide a circuitry for switching heavy loads of power at very rapid rates.

It is another object of the present invention to provide a system which will dependably test and monitor the output from a low frequency, high power transmitter.

It is another object of the present invention to provide a switching system for switching an electric load "ON" and "OFF" in response to code signals.

It is yet another object of the present invention to provide a switching system for a three-phase high-power input.

It is still another object of the present invention to provide a switching system for a three-phase high-power as the switching elements.

The foregoing and other objects, features and advantages of the invention will be apparent from the following more particular description of a preferred embodiment of the invention, as illustrated in the accompanying drawings.

In the drawings, wherein like reference characters refer to like elements throughout:

FIG. 1 is a schematic diagram showing a portion of a control circuit according to the invention;

FIG. 2 shows various wave forms obtained at various points in the circuitry of FIG. 1;

FIG. 3 is a schematic diagram of a portion of the circuit of the invention showing the power switching elements;

FIG. 4 shows a circuit for coupling a control signal from the circuit of FIG. 1 to the phase 1 circuit of FIG. 3;

FIG. 5 shows a coupling circuit for coupling a control signal from the circuit of FIG. 1 to the phase 2 circuit of FIG. 3;

FIG. 6 shows a circuit for coupling a control signal from the circuit of FIG. 1 to the phase 3 circuit of FIG. 3;

FIG. 7 shows a simplified schematic diagram of the circuit of FIG. 3 and is useful in explaining the operation of FIG. 3;

FIG. 8 shows a three-phase wave form input signal and is useful in explaining the operation of FIG. 3 and 7; and FIG. 9 shows wave forms which are useful in explaining the switching operation of FIGS. 1, 3 and 4.

Referring to FIG. 1 which shows a circuit diagram of one portion of the system of the invention and also to FIG. 2 which shows wave forms useful in explaining the operation of the circuit of FIG. 1 shows a magnetic tape reader 13, of any suitable known type for reading or playing back a magnetic tape having a coded signal recorded thereon. The signal on the tape is a 1 kc. tone and may vary from a continuous ON or OFF signal to a signal which may have a time duration of twenty milliseconds ON and twenty milliseconds OFF. The signal from the tape reader 13 is coupled through a lead 14 to an amplifier 15 of any suitably known type. The signal tone appearing on lead 14 is shown in the graph of FIG. 2 labeled, 1 kc. tone. The signal from the amplifier 15 is coupled through leads 16 and 17 to a conventional diode bridge rectifier 18. The amplified signal appearing at the points labeled A on leads 16 and 17 is indicated by the wave forms labeled A—A in FIG. 2. The rectified signal output from the bridge rectifier 18 is coupled through leads 21 and 22; and, the signal appearing at the points marked B—B on leads 21 and 22 is indicated by the wave form labeled B—B, FIG. 2.

Briefly moving to the left-hand portion (as oriented in FIG. 1) of the circuit, the potential for energizing the circuit of FIG. 1 is obtained from a 60-cycle alternating current source, of any suitable known type, through a transformer 90, which includes a primary winding 91 and a secondary winding 92. The secondary winding 92 of transformer 90 is connected through a diode rectifier 93 and a series resistor 94 across, or in parallel with, a capacitor 95. The lower terminal (as oriented in FIG. 1) of capacitor 95 is connected to a common lead 60. The rectified energizing voltage developed across capacitor 95 is coupled through a series resistor 96 to a parallel connected Zener diode 97. The Zener diode 97 which functions to limit the energizing voltage applied to the circuit of FIG. 1 has its cathode connected to a lead 40 and its anode connected to the common lead 60.

A resistor 81 is connected in series with the two base electrodes 77 and 78 of a unijunction transistor 75, and the primary winding 84 of a transformer 83. The upper junction of winding 84 is labeled J in FIG. 1 for purposes of the description to follow. As will be explained hereinbelow, the output signal from the circuit of FIG. 1 is obtained across winding 84. The emitter 76 of the unijunction transistor 75 is connected to one terminal of a capacitor 79; and, the other terminal of capacitor 79 is connected to the common lead 60. The unijunction transistor 75 and the capacitor 79 function as a triggered ON-OFF free running oscillator. As is known in the art, the unijunction transistor 75 functions as a high impedance element until the voltage provided by capacitor 79 across the emitter 76 to base 78 circuit is approximately 60% of the voltage appearing across the base 77 to the base 78 of the unijunction transistor 75, at which time the unijunction transistor 75 will conduct. When the unijunction transistor 75 conducts, it permits capacitor 79 to discharge and a current flows through the primary winding 84 of transformer 83 to provide an output signal through the secondary windings labeled TA, as will be more fully described hereinbelow.

Returning now to the signal control portion of the circuit of FIG. 1, the upper terminal (as oriented in FIG. 1) of the bridge rectifier 18 is coupled through lead 21, a series resistor 23, and a lead 40 to a parallel connected Zener diode 24. The cathode of the Zener diode 24 is connected to lead 40 at terminal point C, and the anode of the Zener diode is connected to lead 22 at terminal point B. The Zener diode 24 is arranged to clip or limit the voltage to about 15 volts, as shown by the wave form labeled C-B in FIG. 2. The lower terminal point B is connected to the anode of another Zener diode 26; and, the cathode of the Zener diode 26 is connected through lead 30, a resistor 37 and an inductor coil 36 to the base 33 of a PNP type transistor 31. The lower terminal of resistor 37 which is connected through lead 30 to the cathode of the Zener diode 26 is labeled D. A resistor 25 has one terminal connected to lead 40 and its other terminal connected to lead 30 and to the cathode of Zener diode 26.

The signals appearing across the points labeled C on lead 40 and D on lead 30 are indicated by the wave form labeled C-D in FIG. 2. The terminal point C is also connected through lead 40 directly to the emitter 32 of the transistor 31 and is also connected through a tunnel diode 35 to the base 33 of the transistor 31. The filtered rectified signal C-D causes the tunnel diode 35 to shift past its peak point current to its high voltage state to thereby render transistor 31 conductive. The tunnel diode 35 functions to speed up the transition of transistor 31 from a fully nonconductive condition to a fully conductive condition and vice versa. The inductor 36 and the resistor 37 form a short time delay network to desensitize the tunnel diode 35 from the effects of electrical shock loading.

The collector 34 of transistor 31, also labeled E in FIG. 1, is connected through a resistor 64 to the common lead 60. The collector 34 is also connected through resistor 47 to a parallel circuit including in one arm, a series connected adjustable resistor 61 and a capacitor 62. The other arm of the parallel circuit comprises a series connected resistor 59, the base 56 to base 57 circuit of a unijunction transistor 55 and a resistor 63 connected to the common lead 60. The junction labeled G of the adjustable resistor 61 and the capacitor 62 is connected to the emitter 58 of the unijunction transistor 55. The unijunction transistor 55 and the capacitor 62 function as a triggered free running oscillator as described above with reference to the unijunction transistor 75 and capacitor 79.

The lower base 57 of the unijunction transistor 55 is also connected to the control electrode 54 of a silicon controlled rectifier (SCR) 51. The cathode 53 of the SCR 51 is connected to the common lead 60 and the anode 52 of the SCR is connected to the junction of resistor 47 and resistor 48. The other terminal of resistor 48 is connected to inductor 46.

The collector 34 of transistor 31 is connected directly through a lead 50 to the emitter 42 of transistor 41. The collector 34 of transistor 31 is also connected through the lead 50 and a tunnel diode 45 to the base 43 of a PNP type transistor 41. The tunnel diode 45 has its anode connected to lead 50, has its cathode connected to the base 43, the tunnel diode 45 functions to speed up the transition of transistor 41 from a fully nonconductive condition to a fully conductive condition and vice versa.

The collector 44 of transistor 41 is connected through a diode 65 and a resistor 71 to the common lead 60. The junction of the cathode of diode 65 and resistor 71 is connected to the base 68 of a transistor 66. The emitter 67 of transistor 66 is connected through resistor 73 to lead 40, and the collector 69 of transistor 66 is connected through a resistor 72 to the common lead 60. The junction of emitter 67 and resistor 73 is connected to the emitter of the aforementioned unijunction transistor 75.

The operation of the circuit of FIG. 1 will now be explained. Assume the circuit of FIG. 1 is energized by the suitable current source through transformer 90. The AC power is rectified, filtered, limited or clipped and applied to the circuit of FIG. 1. It should be appreciated, that the output signals from the circuit of FIG. 1 are obtained from the primary winding 84 of transformer 83, which signals are generated by the oscillator comprising unijunction transistor 75 and the capacitor 79. Initially, transistor 66 which bypasses the capacitor 79 is arranged to be conducting and hence does not permit the capacitor to charge and thus prevents oscillation of the unijunction transistor 75 and the capacitor 79.

Assume next that the tape reader 13 reads a 1 kc. signal tone, as shown in the wave form labeled 1 kc. tone in FIG. 2. As mentioned above, the 1 kc. tone is amplified by amplifier 15 to provide a signal labeled A—A in FIG. 2. The signal is rectified by rectifier 18 to provide a signal labeled B—B in FIG. 2. The rectified signal is coupled through the clipping network including the Zener diode 24 to provide the signal labeled C-D in FIG. 2 to the transistor 31. The signal C-D biases the transistor 31 to conduct to develop the signal labeled E-F at its collector electrode 34. The signal E-F at the collector 34 is coupled through resistor 47 and the adjustable resistor 61 to charge capacitor 62. As is known, the capacitor 62 will charge to the level at which the emitter 58 of the unijunction transistor 55 has a voltage impressed thereon which is approximately 60% of the voltage impressed across the base 56 to the base 57 of the unijunction at transistor 55. When the voltage coupled by the capacitor 62 to the emitter 58 reaches this 60% point, the unijnuction transistor 55 will conduct and the capacitor 62 will discharge. The discharge path of the capacitor 62 may be traced from the upper plate of capacitor 62 through the emitter 58 to the base 57 circuit of the unijunction transistor 55, and the resistor 63 to the common lead 60. The signal appearing across the capacitor 62 is labeled G-F in FIG. 2, and consists of a finite charging period and a relatively instantaneous discharging period.

When the unijunction transistor 55 conducts, the resulting current flowing through the resistor 63 develops a positive voltage which is coupled to the control electrode 54 of the SCR 51. Since the SCR 51 already has a positive voltage coupled thereto through resistor 47 from the collector 34 of transistor 31, the SCR 51 will conduct when the positive voltage is applied to its control electrode 54. Once the SCR 51 is rendered conductive it will remain conductive as long as the positive signal E-F is present at the collector 34 of transistor 31.

When the SCR 51 conducts, the voltage at its anode 52 drops to relatively less positive level, and this lower voltage is coupled through the inductor coil 46 to the base 43 of transistor 41. When the voltage on the base 43 of transistor 41 drops, transistor 41 will be forward biased and will conduct. The inductor coil 46 will delay the application of this lower voltage to the base 43 by a short time period.

The current flow through the transistor 41, and through the series circuit of diode 65 and resistor 71 will cause a positive voltage to be coupled to the base of the transistor 66 to cause this transistor to stop conducting. When transistor 66 stops conducting, capacitor 79 which is in parallel with transistor 66 starts charging toward the supply voltage. The capacitor 79 charges toward the full supply voltage minus the drop appearing across resistor 73, but when the voltage across the capacitor 79 increases to a value which is approximately 60% of the voltage appearing across the base 77 to base 78 of the unijunction transistor 75, the unijunction transistor 75 will conduct and the capacitor 79 will discharge. The discharge path for capacitor 79 may be traced from the upper plate of the capacitor 79 through the emitter 76 to the base 78 circuit of the unijunction transistor 75, and the primary winding 84 of the transformer 83 to the common lead 60.

The signal appearing across the capacitor 79 is shown by the wave forms labeled H–F in FIG. 2. Note that the charging of the capacitor 79 will be delayed in time until the signal G–F in FIG. 2 terminates; that is, until capacitor 62 discharges through unijunction transistor 55.

The current flowing through the primary winding 84 of the circuit output transformer 83 provides one of the pulses labeled J–F in FIG. 2. After the capacitor 79 discharges, transistor 75 will again be biased to turn OFF and the capacitor 79 starts to charge toward the supply voltage; and, the cycle is repeated. The transistor 75 and the capacitor 79 will continue to oscillate as long as transistor 66 is maintained cut-off. Transistor 66 will remain cut-off as long as the SCR 51 remains conducting; and the SCR 51 will remain conducting as long as a positive signal E–F is present at the collector 34 of transistor 31. Thus, each time that the tape reader 13 reads a signal tone on the magnetic tape, the oscillator consisting of unijunction transistor 75 and the capacitor 79 will, after a short time delay period, start oscillating and will continue to oscillate to provide output pulses J–F for the duration of the signal tone.

The circuit of FIG. 3 shows the load circuit of the invention including the high power switching elements which are silicon controlled rectifiers (SCR's). In FIG. 3, a three-phase 480 volt 60-cycle power signal is coupled through circuit breaker generally labeled CB–2 and leads 101, 102 and 103 to respective load circuits 104, 105 and 106, each of which load circuits includes respective SCR's 111–116, 121–126 and 131–136 which for purposes of explanation will be referred to as the power SCR's.

Three delta connected windings labeled T1–2, T2–3 and T3–1 are connected through leads 107, 108 and 109; circuit breaker generally labeled CB–1; and leads 101, 102 and 103 to the load circuits 104, 105 and 106, respectively. As shown, the junction of windings T1–2 and T3–1 is connected to lead 107, the junction of windings T1–2 and T2–3 is connected to lead 108, and the junction of windings T2–3 and T3–1 is connected to lead 109.

The circuit of FIG. 3 includes three identical circuits, one circuit for each of the three input phases. The phase 1 circuit labeled 104 has its input terminal connected to lead 101 to receive the phase 1 input; the phase 2 circuit labeled 105 has its input terminal connected to lead 102 to receive the phase 2 input; and the circuit labeled 106 has its input terminal connected to lead 103 to receive the phase 3 input.

Each of these circuits 104, 105 and 106, in turn, includes three identical subcircuits. In circuit 104 the three subcircuits are labeled 141, 142 and 143; in circuit 105 the subcircuits are labeled 151, 152 and 153; and in circuit 106 the subcircuits are labeled 161, 162 and 163.

Since the circuits 104, 105 and 106 are identical, and since the subcircuits 141–143, 151–153 and 161–163 are identical, only the circuit 104 need be described in detail.

The subcircuit 104 includes a pair of parallel connected SCR's labeled 111 and 112. The SCR's 111 and 112 are connected in the same relative conducting polarity, that is, their cathodes are connected together and to lead 101 and their anodes are connected together. A diode labeled 144, which is also connected in parallel with the SCR's 111 and 112, is connected in relatively reverse conducting polarity with respect to SCR's 111 and 112; that is, the anode of diode 144 is connected to the cathodes of the SCR's 111 and 112, and to lead 101; and, the cathode of diode 144 is connected to the anodes of the SCR's 111 and 112. The anodes of the SCR's 111 and 112 and the cathode of diode 144 are connected through an inductor element 145, a fuse 146 and a resistor 171 to a common or return lead 148. A resistor 181 has one terminal connected to lead 101 and its other terminal connected to the junction of fuse 146 and resistor 171. The resistor 181 is thus effectively also connected in parallel with the SCR's 111 and 112 and the diode 144.

The three banks of SCR's 111–116, 121–126 and 131–136 function as a switching control, as will be explained. The division of each SCR bank 111–116, 121–126 and 131–136 into three separate subcircuits assures load sharing and provides a more positive fuse protection.

The nine resistors 171–179 in the load circuits 104, 105 and 106 represent the main load to be switched; and, in one embodiment, the load consisted of conventional resistor grid loading banks with forced convection cooling, not shown.

The resistor 181 connected in parallel with the power SCR's 111 and 112 is used to reduce the voltage appearing across the SCR's 111 and 112. With the SCR's 111 and 112 nonconducting or OFF, a small amount of power is fed through load resistor 171 and resistor 181; accordingly, the voltage appearing across the SCR's 111 and 112 is a function of the ratio of the resistors 171 to 181. In order to obtain the foregoing reduction of the voltage appearing across the SCR's 111 and 112, a higher power level is required on the ON condition of the SCR's to make the power difference between the ON and OFF conditions equal a given maximum.

The cricuit of FIG. 3 would operate merely by applying a gate or gating signal to all the power SCR's 111–116, 121–126 and 131–136 when the control tone is present; and by turning off the gate signal when the control tone is not present. However, the foregoing is not entirely satisfactory since the gates are at different line potentials, and with a 480 volt, three phase input, an instantaneous difference of approximately 678 volts can be developed which makes direct coupling difficult and also imposes high voltages on the control circuit.

Also, another reason why direct coupling is not satisfactory is that for extremely short pulse intervals of 20 ms. (milliseconds) duration the power pulse interval may differ from the coded input intervals. As an aid in understanding the foregoing, refer to FIG. 7 which is a simplified schematic diagram of a portion of FIG. 3. Assume all three SCR's 111′, 121′ and 131′ are gated on in accordance with signals from coded magnetic type input. Assuming next that the coded input turns off and that gates are likewise turned off. As there is no synchronization of coded input pulses with line frequency, this can occur at any point in the power cycle.

Refer no wto the three phase sine curves of FIG. 8 which represent the line to neutral voltages and also represent the line currents in a balanced resistor load system. The wave form above the axis labeled N in FIG. 8 represents rectifier current and the wave form below the N axis represents SCR current.

Assuming the gates are removed at the point in time indicated by the line labeled X, the SCR's numbered 111′ and 131′ are conducting and the rectifier 127′ is conducting. Due to the characteristics of the SCR's, the conducting SCR's will continue to conduct until the line current tends to reverse. Accordingly, a three phase sinosoidal conduction will continue until the waveform on line 2 passes through N axis at Y. The SCR 121' not being gated ON, cannot conduct, and phase 2 current remains at zero. The phase 1 and phase 3 lines continue to conduct as a single phase circuit until line 1 becomes positive with respect to line 3 at point Z. The SCR 111' then discontinues conducting and all three line currents become zero.

In length of time the period from point X to point Z represents 180°+30° maximum, or 210° maximum, which has been found to be about 9.7 milliseconds (ms.). The minimum length of time occurs when the gates are turned off at point Y and conduction again terminates at Z; this represents a total of 60°+30°, or 90° which is approximately 4.2 ms.

If the pulses are a series or train of coded 20 ms. ON and 20 ms. OFF, the power pulses could be a train of pulses varying from a maximum ON time of 20+9.7 or 29.7 ms. to a minimum of 20+4.2 or 24.2 ms. with OFF time varying from a maximum of 20—9.7 or 10.3 ms. to a minimum of 20—4.2 or 15.8 ms. From an average standpoint, the net results is that the average power would be ON 29.7+24.2/2 or 27 ms., and OFF 10.3+15.8/2 or 13 ms. which is a major deviation from the coded pulse signal input.

Because of the foregoing, an indirect coupling between the control and the power circuits is employed. In addition, the circuit of the invention employs an initial time delay to even out the ON power and OFF power time particularly for trains or series of short interval coded pulses.

The circuits for coupling the control signals from the circuit of FIG. 1 to the power switching circuit of FIG. 3 are shown in FIGS. 4, 5 and 6. The coupling circuits of FIGS. 4, 5 and 6 are similar, but each circuit is arranged to energize a different bank of power SCR's in FIG. 3 and in relation to the respective power input phase. For example, the circuit of FIG. 4 is arranged and connected to energize the SCR's 111–116 of phase 1 bank; and, the circuits of FIGS. 5 and 6 are arranged and connected to energize the SCR's 121–126 and 131–136 of the phase 2 and phase 3 banks, respectively.

Referring to FIG. 4, the winding TA–1 is a secondary winding of the transformer 83 of FIG. 1 which provides an output control signal. The transformer 83 includes three secondary windings TA–1, TA–2 and TA–3 which drive or feed three silicon controlled rectifiers (SCR's), as shown in FIGS. 4, 5 and 6 labelled 202, 230 and 232 respectively. For purposes of description the SCR's 202, 230 and 232 will also be termed the pilot SCR's.

The circuits of FIGS. 3–6 as shown are arranged to switch a load of 825 kilowatts. For one embodiment of the invention wherein it was desired to switch a load of 1650 kilowatts, three additional pilot SCR circuits and another circuit identical to FIG. 3 were employed.

The winding TA–1 has one terminal connected through a diode 201 to the control electrode 203 of the pilot SCR 202. The anode of the diode 201 is connected to winding TA–1 and the cathode of diode 201 is connected to the control electrode 203 of the SCR 202, and to the cathode of a diode 208. The other terminal of winding TA–1 is connected through a resistor 206 to a lead 207 and to the cathode 205 of the SCR 202.

The anode 204 of SCR 202 is connected through a resistor 209 to the cathode of a diode 210, and the anode of diode 210 is connected to one terminal of a winding T3–1. The diode 210 rectifies the output of winding T3–1. The other terminal of winding T3–1 is connected to the cathode of a diode 211, and the anode of diode 211 is connected to one terminal of a winding T2–3. The diode 211 rectifies the output of winding T2–3. The other terminal of winding T2–3 is connected to a common lead 1G. Two series connected diodes 212 and 213 are connected from the junction of diode 210 and resistor 209 to the common lead 1G. The junction of the diodes 212 and 213 is connected to the junction of winding T3–1 and diode 211. Diodes 210, 211, 212 and 213 are connected so that the voltage appearing from the junction of diode 210 and resistor 209 to the lead labeled 1G is the sum of the positive voltages from the two control transformers T3–1 and T2–3, see the wave form labeled Forward Voltage SCR's in FIG. 9. During time when control transformer voltage is negative, the respective diodes bypass the negative voltage.

The anode of diode 208 is connected to the anode of a Zener diode 222 and the cathode of the Zener diode 222 is connected to a variable tap 223 of a rheostat 224. One terminal of the rheostat 224 is connected to the junction of the cathode of two diodes 225 and 226. The anode of diode 225 is connected to one terminal of a winding T3–1 and the other terminal of winding T3–1 is connected to lead 207. The anode of diode 226 is connected to one terminal of a winding T1–2 and the other terminal of winding T1–2 is connected to lead 207.

The positive instantaneous polarity of each of the windings T2–3, T3–1 and T1–2 in the circuit of FIG. 4 is indicated by the dot adjacent each winding.

The rheostat 224, the two transformer secondaries T2–3 and T3–1 are across phases which produce forward blocking voltages in the power SCR's 111–116. If a voltage which is too high occurs, gate currents will flow in the control electrode 203 of SCR 202 causing the SCR 202 to turn on or become conductive. When SCR 202 turns on, the associated power SCR's 111–116 are turned ON and hence transient voltages are coupled to or placed on the load resistors 171–179 where the transient voltages can be harmlessly dissipated.

The pilot SCR 202 has its cathode 205 connected through lead 158 and a resistor 216 to the terminal labeled 1A, which is the terminal of the control electrode of the power SCR 111 in FIG. 1. The cathode 205 of SCR 202 is likewise connected through resistors 217–221 to the control electrodes 1B–1F of SCR's 112–116. The cathode 205 of SCR 202 is also connected to the cathode of a Zener diode 215 and the anode of the Zener diode 215 is connected to lead 1G. The voltage across Zener diode 215 is approximately 6.8 volts and hence when the SCR 202 conducts, a potential of about 6.8 volts is coupled through lead 158 and the resistors 216–221 to the control electrodes 1A–1F of the six power SCR's 111–116 of the phase 1 circuit 104.

Likewise, when the pilot SCR's 230 and 232 in the control circuits of FIGS. 5 and 6 conduct, a potential of 6.8 volts is provided to the control electrodes 2A–2F and 3A–3F of the power SCR's 121–126 and 131–136 in the phase 2 and phase 3 circuits 105 and 106, respectively.

The input voltage to each pilot SCR is chosen to have a given phase relationship with its power SCR's. The frequency of the running oscillator comprising the unijunction transistor 75 and the capacitor 79 is high compared with the frequency of the 60 cycle power input on lines 101, 102 and 103. Accordingly, at least two pulses (wave forms labeled J–F in FIG. 2) will be generated during the time the pilot SCR's 107, 108 and 109 are initially forwarded biased until one of the power SCR's 111–116, 121–126 or 131–136 can be in the forward blocking state, see lines Q—Q of FIG. 9. The first pulse of a given 1 kc. tone burst can occur anywhere in the forward blocking state and the power SCR's must be capable of switching from the high voltage blocking state to the high current conducting state. So that the rate of rise of current is held to design value not to exceed the capability of the SCR devices a small inductor coil is connected in the output line of each pair of the power SCR's 111–116, 121–126 and 131–136, for example, see the inductor labeled 145 in the subcircuit 141.

Note that the time at which the first trigger pulse is obtained from the transformer 83 in relationship to the initiation of the 1 kc. tone is adjustable by means of resistor 61, FIG. 1. Also, the last trigger pulse can occur at any point from the beginning of forward voltage on a pilot SCR 202, 230 and 232 to the end of forward voltage on the pilot SCR's. This is a maximum period of 300° or approximately 13.6 ms. The minimum period within which the trigger pulses can occur is 180° due to three phase voltages being acted upon, or approximately 8.33 ms. The average overlap will be 13.7+8.33/2=11 ms. Therefore, the initial delay of the trigger pulses is set for 11 ms. so that for 1 kc. tone signal, where the coded signal is ON for 20 ms. and OFF for 20 ms., the maximum length is given by the formula 20—11+13.6=22.6 ms.; and, the minimum length is given by the formula 20—11+8.3=17.3 ms. Therefore, the average length is 22.6+17.3/2 which is about 20 ms. which is the desired average power train.

The operation of the circuit of FIG. 3 will now be described.

Assume that the circuit breakers CB2 have been closed and that 480 volts, 60 cycle AC is coupled to the circuit of FIG. 3. Assume that the tape reader 13 provides an output signal indicating a 1 kc. tone to the circuit of FIG. 1 (see wave form labeled 1 kc. tone in FIG. 2). The transformer 83 will develop a pulse signal (see wave form J-F of FIG. 2) on its secondary windings TA-1, TA-2 and TA-3 shown in FIGS. 4, 5 and 6. The secondary windings TA-1, TA-2 and TA-3 will bias or gate ON the pilot SCR's 202, 230 and 232 respectively. The SCR's 202, 230 and 232 will become conductive dependent on the instantaneous polarity voltage provided to the pilot SCR's 202, 230 and 232 by the phase windings T1-2, T2-3 and T3-1.

For example, when the pilot SCR 202 is rendered conductive, current flow through the pilot SCR 202 and the respective resistors 216–221 energize the terminals labeled 1A-1F of the control electrodes of power SCR's 111–116 of FIG. 3 to gate ON the SCR's 111–116.

Assume the instantaneous power phase relation, at point K of FIG. 8. With the SCR's 111–116 conductive, a current flow path may be traced through the power switching circuit of FIG. 1, from line 103, the phase 3 circuit 106 to the common line 148. More specifically, the flow path through circuit 106 is through parallel connected diodes 164, 165 and 166, and the respective inductors 167, 168 and 169; the fuses 240, 241 and 242; and the respective load impedances in the form of resistors 177, 178 and 179 to the common line 148. A return current flow path may be traced from common line 148 through the parallel connected load resistors 171, 172 and 173 of the phase 1 circuit, the associated fuses and inductors, and through the conducting SCR's 111–116 to line 101. Another return path may be traced from the line 148 through the parallel connected load resistors 174, 175 and 176 of the phase 2 circuit, the associated fuses and inductors, not numbered, and the SCR's 121–126 to line 102.

The frequency of the pulse signals coupled from transformer 83 to the pilot SCR's 202, 230 and 232 is much higher than the power signal frequency. The gating signal applied to the SCR's 111–116, 121–126 and 131–136 is indicated by the wave form Forward Voltage to Pilot SCR's in FIG. 9; the gating signal is limited by Zener diode 215, and by the unlabeled Zener diodes of FIGS. 5 and 6. Note that SCR's, once conducting, continue to conduct until the anode to cathode polarity changes even though the gating signal may be removed.

Assuming now that the 1 kc. tone signal terminates, hence gating signals on the control electrodes of the power SCR's 111–116, 121–126 and 131–136 are turned off. When their pilot SCR's are turned off, assume that the gating signal to pilot SCR's is removed at the point indicated as X in FIG. 8. At this point the SCR's 111–116 in the phase 1 circuit 104 and the SCR's 131–136 in the phase 3 circuit 106 are conducting and the rectifiers 127, 128 and 129 in the phase 2 circuit 105 are conducting. The SCR's 111–116 and 131–136 will continue to conduct until the line current tends to reverse. Accordingly, power current will continue to be a three-phase sinosoidal current and the current path may be traced through diodes 127, 128 and 129 of the circuit 105, common lead 148 and through the SCR's 111–116 of the phase 1 circuit 104 and the SCR's 131–136 of the phase 3 circuit 106. This three-phase current will continue until the current in line 102 passes through the neutral N axis at point Y, as shown in FIG. 8.

The SCR's 121–126 in the phase 2 circuit 105 which have not been gated on cannot conduct and the phase 2 current becomes zero. The power signal current continues to flow through the phase 1 and phase 3 circuits as a single phase current in a path which may be traced from line 103 through the phase 3 circuit 106 and the associated diodes 164, 165 and 166, the common lead 148, the phase 1 circuit 104 and the associated SCR's 111–116, and lead 101 back to the signal source. This single phase curent conduction continues until line 101 becomes positive with respect to the voltage on line 3, at which time the SCR's 111–116 discontinue conducting and all three line currents become zero.

While the invention has been particularly shown and described with reference to a preferred embodiment thereof, it will be understood by those skilled in the art that changes in form and details may be made therein without departing from the spirit and scope of the invention.

We claim:

1. A load switching system comprising in combination:
   (a) means for coupling a signal of relatively low frequency and high power to said system as a multiphase input;
   (b) a multiphase switching circuitry comprising individual, identical, interconnected circuits;
   (c) each phase circuitry, in turn, comprising individual, identical, interconnected subcircuits;
   (d) each subcircuit including SCR's each having an anode, a cathode and a control electrode, and said SCR's being connected in parallel with one another and with a polarity to permit current flow in a same first direction;
   (e) each subcircuit also including a diode connected in parallel with said SCR's, said diode being connected with a polarity to permit current flow in a second direction opposite to the direction of current flow through said SCR's;
   (f) a load resistor connected in series with each of said subcircuits; and
   (g) means for selectively triggering the control electrodes of the SCR's in each of said phase circuits, such that the current flow is dissipated in said load resistors.

2. A control circuit comprising means for receiving a tone from a magnetic tape input:
   (a) first and second oscillator means each including a unijunction transistor and a capacitor;
   (b) an SCR connected to be rendered conductive when said first oscillator starts oscillating;
   (c) a normally conducting transistor connected in parallel to the capacitor of said second oscillator whereby said capacitor can charge only to a voltage below a selected level; and
   (d) said transistor connected to said SCR and being arranged to turn OFF when said SCR conducts;
   (e) whereby said second oscillator is caused to oscillate and provide an output signal.

3. A transmitter testing system, comprising in combination:
   (a) means for coupling a signal of relatively low frequency and high power to said system as a multiphase input;
   (b) in a multiphase switching circuitry comprising individual, identical interconnected circuits;
   (c) each phase circuitry, in turn, comprising individual, identical, interconnected subcircuits;

11

(d) each subcircuit including SCR's, each having an anode, a cathode and a control electrode and said SCR's being connected in parallel with one another and with a polarity to permit current flow in a same first direction;
(e) each subcircuit also including a diode connected in parallel with said SCR's, said diode being connected with a polarity to permit current flow in a second direction opposite to the direction of current flow through said SCR's;
(f) a load resistor connected in series with each of said subcircuits;
(g) first and second oscillator means each including a unijuction transistor and a capacitor;
(h) an SCR connected to be rendered conductive when said first oscillator starts oscillating;
(i) a normally conducting transistor connected in parallel to the capacitor of said second oscillator whereby said capacitor can charge only to a voltage below a selected level; and
(j) said transistor connected to said SCR and being arranged to turn OFF when said SCR conducts;
(k) whereby said second oscillator is caused to oscillate and provide an output signal for selectively triggering the control electrodes of the SCR's in each of said phase circuits, such that the current flow is dissipated in said load resistors.

4. A transmitter testing system arranged to receive an ON-OFF tone signal representative of transmitter transmissions comprising in combination:
(a) means for coupling a signal of relatively low frequency and high power to said system as a three-phase input;
(b) a three-phase switching circuitry comprising individual, identical, interconnected circuits;
(c) each phase circuitry, in turn, comprising individual, identical, interconnected subcircuits;
(d) each subcircuit including a pair of SCR's, each having an anode, a cathode and a control electrode and said SCR's being connected in parallel with one another and with a polarity to permit current flow in a same first direction;
(e) each subcircuit also including a diode connected in parallel with said SCR's, said diode being connected with a polarity to permit current flow in a second direction opposite to the direction of current flow through said SCR's;

12

(f) a load resistor connected in series with each of said subcircuits;
(g) oscillator means arranged to oscillate in response to an ON tone signal to provide an output signal for selectively triggering the control electrodes of the SCR's in each of said phase circuits such that the current flow is dissipated in said load resistors.

5. A circuit as in claim 3 wherein a second resistor is connected in parallel with the SCR's of said subcircuits whereby when said SCR's are not conducting, the voltage appearing across said SCR's is a function of the ratio of the resistance of said load resistor to said second resistor.

6. A load switching system comprising in combination:
(a) a control circuit responsive to input signals;
(b) a power switching circuit;
(c) said control circuit connected to control the operation of said power switching circuit;
(d) a plurality of load current conducting means in said power circuit arranged to be selectively rendered conductive by a signal coupled thereto by said control circuit;
(e) impedance means connected in the current flow path of said load current conducting means;
(f) each of said load current conducting means being arranged as three distinct subcircuits with each subcircuit having one terminal connected to one phase of a three-phase input and its other terminal connected in common to the other subcircuits; and
(g) each subcircuit including a parallel circuit comprising a unidirectional conductive device and a silicon controlled rectifier connected in relatively reverse polarity.

7. A load switching system as in claim 6 wherein a load resistor is connected in series with each of said parallel circuits.

References Cited

UNITED STATES PATENTS 3,205,378    9/1965    Kline             307—252 X
3,287,622    11/1966    Eckenfelder et al.    307—252 X ARTHUR GAUSS, *Primary Examiner.*

J. D. FREW, *Assistant Examiner.*

U.S. Cl. X.R.

307—13, 232, 252, 286, 305, 318; 328—210, 251

UNITED STATES PATENT OFFICE
CERTIFICATE OF CORRECTION

Patent No. 3,448,294                              June 3, 1969

Robert M. Henderson et al.

It is certified that error appears in the above identified patent and that said Letters Patent are hereby corrected as shown below:

Column 2, line 1, "vide" should read -- provide --; line 1 "for a three-phase high-power" should read -- utilizing solid state devices --; line 36, after "1" insert a period; same line 3( before "shows" insert -- Fig. 1 --. Column 4, line 9, "43," shoul( read -- 43. --; line 9, "the" should read -- The --. Column 6, li; 41, "cricuit" should read -- circuit --; line 63, "no wto" should read -- now to --. Column 8, line 53, before "running" insert -- free --. Column 10, line 18, "curent" should read -- current --; line 72, cancel "in".

Signed and sealed this 23rd day of February 1971.

(SEAL)
Attest:

Edward M. Fletcher, Jr.                         WILLIAM E. SCHUYLER, JR.
Attesting Officer                                 Commissioner of Patents